(12) United States Patent
Koitabashi et al.

(10) Patent No.: US 8,113,800 B2
(45) Date of Patent: Feb. 14, 2012

(54) SCROLL FLUID MACHINE

(75) Inventors: Yoshitaka Koitabashi, Honjo (JP); Shigeyuki Koyama, Isesaki (JP); Kou Tsukamoto, Isesaki (JP); Tomokazu Naruta, Isesaki (JP)

(73) Assignee: Sanden Corporation, Isesaki (JP)

( * ) Notice: Subject to any disclaimer, the term of this patent is extended or adjusted under 35 U.S.C. 154(b) by 996 days.

(21) Appl. No.: 11/886,286

(22) PCT Filed: Apr. 6, 2006

(86) PCT No.: PCT/JP2006/307319
§ 371 (c)(1),
(2), (4) Date: Sep. 11, 2007

(87) PCT Pub. No.: WO2006/112268
PCT Pub. Date: Oct. 26, 2006

(65) Prior Publication Data
US 2008/0138226 A1    Jun. 12, 2008

(30) Foreign Application Priority Data
Apr. 14, 2005   (JP) ................ 2005-116986

(51) Int. Cl.
*F04B 17/00*    (2006.01)
(52) U.S. Cl. ............... 417/410.5; 174/152 G
(58) Field of Classification Search ........ 417/410.5; 174/153 G, 153 R, 650–669; 439/556, 557; 277/314, 606
See application file for complete search history.

(56) References Cited

U.S. PATENT DOCUMENTS

| | | | | |
|---|---|---|---|---|
| 1,385,529 A | * | 7/1921 | Ellis | 313/147 |
| 3,495,028 A | * | 2/1970 | Tutthill | 174/153 R |
| 3,617,616 A | * | 11/1971 | O'Loughlin | 174/94 R |
| 4,219,748 A | * | 8/1980 | Sakaguchi et al. | 310/71 |
| 5,385,453 A | * | 1/1995 | Fogt et al. | 417/410.5 |
| 6,353,185 B1 | * | 3/2002 | Sakata | 174/668 |
| 6,787,701 B2 | * | 9/2004 | Yasuda et al. | 174/664 |
| 2006/0005988 A1 | * | 1/2006 | Jorgensen | 174/65 R |

FOREIGN PATENT DOCUMENTS

| | | |
|---|---|---|
| JP | 48-57601 | 7/1973 |
| JP | 52-139410 | 10/1977 |
| JP | 08-109889 | 4/1996 |
| JP | 9-112422 | 5/1997 |
| JP | 2002-191153 | 7/2002 |
| JP | 2003-111347 | 4/2003 |
| WO | WO 2005081376 A1 * | 9/2005 |

* cited by examiner

*Primary Examiner* — Devon C Kramer
*Assistant Examiner* — Dnyanesh Kasture
(74) *Attorney, Agent, or Firm* — Cozen O'Connor

(57) ABSTRACT

A scroll compressor as a fluid machine includes a housing containing a scroll unit and an armature of an electric motor, and a connection device (66) for electrically connecting each stator coil (62) of the armature to a circuit board external to the housing. The connection device (66) includes a tubular lead holder (70) extending from inside the housing and gastightly passed through a through hole (68) to outside of a housing wall (16), the lead holder (70) having a head (72) and snap anchors (74) holding the housing wall (16) therebetween, and a wire-shaped lead (76) extending from the stator coil (62) and gastightly passed through the lead holder (70) to outside of the housing wall (16).

9 Claims, 5 Drawing Sheets

104

76

SCROLL FLUID MACHINE

RELATED APPLICATIONS

This is a U.S. National Phase Application under 35 USC 371 of International Application PCT/JP2006/307319 filed on Apr. 6, 2006.

TECHNICAL FIELD

The present invention relates to scroll fluid machines, and more particularly, to a fluid machine suited for use as a compressor in a refrigeration circuit for an automotive air-conditioning system.

BACKGROUND ART

In cases where a scroll fluid machine is used as a compressor, namely, as a scroll compressor, in such a refrigeration circuit, the scroll compressor is driven by the engine or electric motor of a motor vehicle. The electric motor-driven scroll compressor is easy to adjust the displacement of the refrigerant, irrespective of engine load, and thus is advantageous in that the temperature in the passenger compartment of the vehicle can be finely controlled.

Also, since this type of compressor is equipped in a vehicle, there has been a demand for smaller-sized compressors. A scroll compressor disclosed in Unexamined Japanese Patent Publication No. H08-109889 has an electric motor incorporated therein. Specifically, the scroll compressor includes a housing used in common for the scroll unit and the armature of the electric motor, and the scroll unit and the armature are contained in the common housing, thereby reducing the overall size of the compressor.

The scroll compressor disclosed in the above publication is also provided with sealed terminal devices for electrically connecting stator coils of the armature to an external feeder circuit. Specifically, the sealed terminal devices include a through hole formed through the outer wall of the housing, a holder plate fitted in the through hole in a gastight manner, a pair of terminals penetrating through the holder plate in a gastight manner for establishing the electrical connection, and a snap ring for fixing the holder plate to the housing.

Accordingly, the sealed terminal devices additionally require an O ring for sealing the gap between the holder plate and the housing as well as glass as a sealing material for sealing the gap between the holder plate and each terminal, making the seal structure complicated. Also, since a stopper, such as the snap ring, is needed to fix the holder plate in position, much time and labor are required to attach the terminal devices to the housing, lowering the productivity of the compressor.

DISCLOSURE OF THE INVENTION

An object of the present invention is to provide a scroll fluid machine of which the electrical connection between an armature of an electric motor contained in a housing and a feeder circuit external to the housing can be easily achieved and which is thus improved in productivity.

To achieve the object, the present invention provides a scroll fluid machine comprising: a housing; a scroll unit contained in the housing and having a fixed scroll and a movable scroll; an armature contained in the housing adjacently to the movable scroll of the scroll unit and adapted to revolve the movable scroll, the armature including a plurality of stator coils; and a connection device for electrically connecting each of the stator coils of the armature to a feeder circuit external to the housing. The connection device includes: a housing wall forming part of the housing and having a through hole; a tubular lead holder extending from inside the housing through the through hole to outside of the housing, the lead holder having a center hole extending through the lead holder in an axial direction thereof, an outer end portion located outside of the housing, and snap anchors protruding integrally from the outer end portion in a radially outward direction of the lead holder and engaging with an outer surface of the housing wall, the snap anchors being elastically deformable in the radial direction of the lead holder; a lead electrically connected to the stator coil, the lead extending from the stator coil to outside of the housing through the center hole of the lead holder and connected to the feeder circuit; and a seal structure for keeping the lead holder gastightly sealed with respect to the housing wall and also keeping the lead gastightly sealed with respect to the lead holder.

The connection device is attached in the manner described below. First, the lead holder is fitted on the lead. At this time, the lead is inserted into the center hole of the lead holder from one end thereof to be located inside the housing, and passed gastightly through the center hole to project from the other end of the lead holder. The lead is passed through the through hole in the housing wall to outside of the housing.

The lead holder having the lead passed therethrough is then gastightly inserted, from its other end, that is, the outer end portion to be located outside of the housing, into the through hole from within the housing. At this time, the snap anchors of the lead holder are elastically deformed toward the outer peripheral surface of the lead holder to permit the insertion of the lead holder. As soon as the other end, or the outer end portion, of the lead holder comes out of the center hole, the snap anchors resume the original state by their own restoring force and engage with the outer surface of the housing wall.

Alternatively, after the lead holder is gastightly fitted in the housing wall in the aforementioned manner, the lead may be inserted into the center hole of the lead holder from inside the housing to be gastightly passed through the center hole to outside of the housing.

In either case, the lead holder can be gastightly fitted into the through hole of the housing wall by just being inserted into the through hole, whereby the lead can be easily guided from inside the housing to the outside through the lead holder, facilitating the electrical connection between the stator coil of the armature and the feeder circuit external to the housing. As a result, the productivity of the fluid machine improves, making it possible to provide the fluid machine at low cost.

Preferably, the lead holder is made of an electrical insulating synthetic resin, and the snap anchors of the lead holder are each in the form of a fin extending in the axial direction of the lead holder and having a distal end directed toward the housing wall.

The lead holder may further include a head located inside the housing and cooperating with the snap anchors to hold the housing wall therebetween. In this case, the lead holder is securely and stably held by the housing wall, enabling the seal structure to fully perform its sealing function.

Specifically, the seal structure includes a first seal member for gastightly sealing a gap between the inner peripheral surface of the through hole in the housing wall and the outer peripheral surface of the lead holder, and a second seal member for gastightly sealing a gap between the inner peripheral surface of the center hole and the outer peripheral surface of the lead. Where the lead holder has the aforementioned head, the seal structure may further include a third seal member for gastightly sealing a gap between the head and the housing wall. Preferably, the first to third seal members are all attached to the lead holder.

The other technical features and advantages of the present invention will become apparent from the following description when taken in conjunction with the accompanying drawings.

BEST MODE OF CARRYING OUT THE INVENTION

Figure 1:
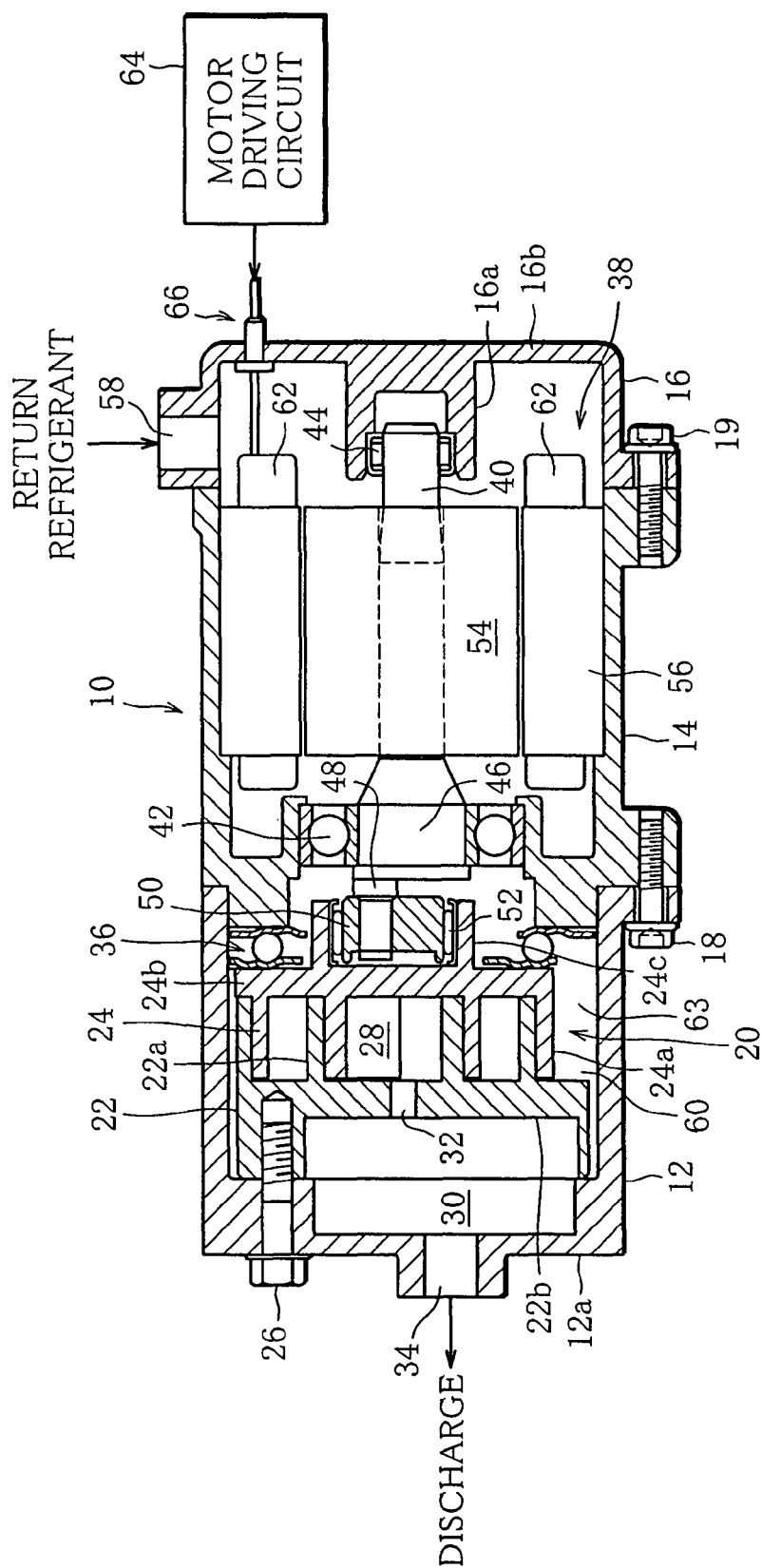
FIG. 1 is a sectional view of a scroll compressor.

A scroll compressor shown in FIG. 1 is incorporated in a refrigeration circuit of an automotive air-conditioning system and used to compress a refrigerant.

The compressor has a cylindrical housing 10. The housing 10 includes a unit casing 12, a motor casing 14, and an end cover 16 arranged in this order as viewed from left to right in FIG. 1. The casings 12 and 14 are coupled together by a plurality of connecting bolts 18, and the motor casing 14 and the end cover 16 are also coupled together by a plurality of connecting bolts 19.

The unit casing 12 contains a scroll unit 20 including a fixed scroll 22 and a movable scroll 24. The movable scroll 24 is located close to the motor casing 14. The fixed scroll 22 is arranged on the same side as the unit casing 12 and fixed to an end wall 12a of the unit casing 12 by fixing bolts 26.

The fixed and movable scrolls 22 and 24 have respective spiral walls 22a and 24a engaged with each other. The spiral walls 22a and 24a thus engaged with each other define a plurality of compression chambers 28 therebetween. As the movable scroll 24 revolves about the fixed scroll 22 as described later, the compression chambers 28 move in the circumferential direction toward the center of the fixed scroll 22, and in the process of movement, the capacities of the compression chambers 28 decrease by degrees.

The unit casing 12 has a discharge chamber 30 defined therein. The discharge chamber 30 has its inner end faces constituted by the end wall 12a of the unit casing 12 and an end plate 22b of the fixed scroll 22, respectively. The end plate 22b of the fixed scroll 22 has a discharge hole 32 formed through the center thereof. The discharge hole 32 is opened and closed by a discharge valve (not shown). The discharge valve is arranged in the discharge chamber 30 and fixed to the end plate 22b of the fixed scroll 22. When each of the compression chambers 28 arrives at the center of the fixed scroll 22, the chamber 28 aligns with, namely, communicates with the discharge hole 32.

Further, the unit casing 12 has a discharge port 34 formed in its end wall 12a. The discharge port 34 has an inner end communicating with the discharge chamber 30 and has an outer end connected to a refrigerant circulation path (not shown) of the refrigeration circuit.

On receiving rotating force from an electric motor, described below, the movable scroll 24 is caused to revolve about the fixed scroll 22 but is prevented from rotating on its axis. To this end, a ball coupling 36 is interposed between an end plate 24b of the movable scroll 24 and the motor casing 14. The ball coupling 36 includes a pair of ring plates and a plurality of balls held between the ring plates and movable only along a fixed circular locus. Consequently, the ball coupling 36 prevents the movable scroll 24 from rotating on its axis and at the same time transmits the thrust load received from the movable scroll 24 to the motor casing 14.

The electric motor includes an armature 38 contained in the motor casing 14. The armature 38 has a rotary shaft 40 located in alignment with the axis of the housing 10 and extending from one end of the motor casing 14 to the end cover 16. The rotary shaft 40 is rotatably supported at opposite ends by the one end of the motor casing 14 and a boss 16a of the end cover 16 through bearings 42 and 44, respectively. The boss 16a protrudes from the inner surface of an end wall 16b of the end cover 16 toward the armature 38.

As is clear from FIG. 1, the rotary shaft 40 has a large-diameter portion 46 formed at one end thereof. The large-diameter end portion 46 has an end face facing the end plate 24b of the movable scroll 24. A crankpin 48 protrudes from the end face of the large-diameter end portion 46 toward the end plate 24b, and an eccentric bushing 50 is mounted on the crankpin 48. The eccentric bushing 50 is rotatably supported by a boss 24c of the movable scroll 24 through a needle bearing 52. The boss 24c protrudes from the end plate 24b of the movable scroll 24 toward the rotary shaft 40.

The armature 38 further includes a rotor 54 mounted on the rotary shaft 40, and a stator 56 surrounding the rotor 54. The stator 56 is fixed to the inner peripheral surface of the motor casing 14 and includes a plurality of stator coils 62.

When the rotary shaft 40 of the armature 38 is rotated, the rotational force thereof is transmitted through the crankpin 48, the eccentric bushing 50 and the needle bearing 52 to the movable scroll 24. Consequently, the movable scroll 24 revolves about the fixed scroll 22 while being prevented from rotating on its axis by the ball coupling 36. The revolving radius of the movable scroll 24 is determined by the distance between the axis of the rotary shaft 40 and the axis of the crankpin 48.

On the other hand, the end cover 16 has an inlet 58 formed through an outer peripheral wall thereof. The inlet 58 has an inner end communicating with the interior of the end cover 16 and an outer end connected to the refrigerant circulation path of the refrigeration circuit. Thus, the inlet 58 allows the refrigerant returned from a condenser in the refrigerant circulation path to flow into the end cover 16.

The return refrigerant in the end cover 16 is guided through the internal gap of the armature 38, the bearing 42 and the ball coupling 36 to the interior of the unit casing 12. The internal gap, the bearing 42 and the ball coupling 36 constitute a refrigerant conduit for the return refrigerant. Specifically, the internal gap of the armature 38 includes a gap between the rotor 54 and the stator 56, and gaps between the stator coils 62. These gaps extend through the armature 38 in the axial direction thereof.

The unit casing 12 has a suction chamber 60 defined therein. The suction chamber 60 surrounds the movable scroll 24 and is supplied with the return refrigerant from the refrigerant conduit. Namely, the inlet 58 is connected to the suction chamber 60. The suction chamber 60 is separated from the discharge chamber 30 in a gastight fashion by the fixed scroll 22.

During revolution of the movable scroll 24, one compression chamber 28 temporarily opens into the suction chamber 60 to be supplied with the refrigerant, and the refrigerant thus sucked in is then confined in the compression chamber 28. As the compression chamber 28 thereafter moves toward the discharge hole 32 of the fixed scroll 22 as mentioned above, the capacity of the compression chamber 28 decreases, with the result that the refrigerant in the compression chamber 28 is compressed. The compression chamber 28 then reaches the discharge hole 32, and when the refrigerant pressure in the compression chamber 28 surpasses the valve closing pressure of the discharge valve, the discharge valve opens, whereupon the compressed refrigerant in the compression chamber 28 is discharged to the discharge chamber 30 through the discharge hole 32.

The compressed refrigerant in the discharge chamber 30 is then delivered through the discharge port 34 to the refrigerant circulation path and supplied via the condenser, a receiver and an expansion valve to an evaporator of the refrigeration circuit. After passing through the evaporator, the refrigerant returns, via the inlet 58, to the interior of the housing 10, that is, the suction chamber 60. The temperature of the return refrigerant is considerably lower than the ambient temperature, and therefore, when the return refrigerant passes through the armature 38, the armature 38 is effectively cooled by the return refrigerant, thus prevented overheating of the armature 38.

Each stator coil 62 of the armature 38 is electrically connected to a feeder circuit, that is, a motor driving circuit 64. The motor driving circuit 64 is arranged outside of the housing 10 and controls the power supply to the stator coils 62 to adjust the rotating speed of the rotary shaft 40 of the armature 38.

Figure 2:
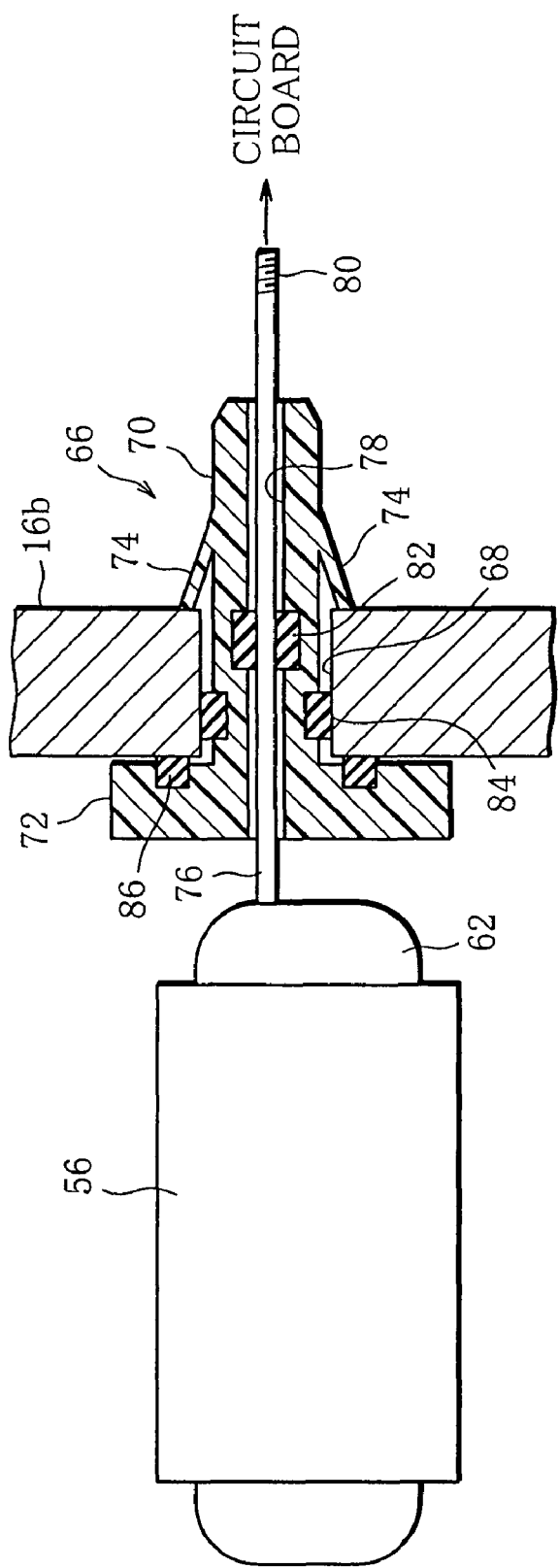
FIG. 2 is a sectional view of a connection device according to a first embodiment.

To electrically connect each stator coil 62 to the motor driving circuit 64, the compressor additionally includes a connection device. FIG. 2 shows in detail a connection device 66 for the stator coil 62 according to a first embodiment.

The connection device 66 includes a through hole 68 formed through the end wall 16b of the end cover 16, and a tubular lead holder 70 fitted through the through hole 68 in a gastight fashion. The lead holder 70 is a one-piece member obtained by molding a synthetic resin. The synthetic resin forming the lead holder 70 is selected from among those having a coefficient of linear expansion equal to that of the end cover 16 and having excellent electrical insulation properties. Needless to say, the synthetic resin to be selected should have impermeability to the refrigerant, that is, good sealing performance.

The lead holder 70 has a circular head 72 at one end thereof. The head 72 is located inside the end cover 16 and has an outer diameter larger than the inner diameter of the through hole 68. The other end portion of the lead holder 70 projects from the through hole 68 to outside of the end cover 16 and has a plurality of snap anchors 74 on its outer peripheral surface. The snap anchors 74 are formed integrally with the lead holder 70. More specifically, the snap anchors 74 are each in the form of a fin extending in the axial direction of the lead holder 70 and are arranged at regular intervals in the circumferential direction of the lead holder 70. Each snap anchor 74 has a distal end directed toward the head 72 and elastically deformable about the base in both directions toward and away from the outer peripheral surface of the lead holder 70. When the snap anchors 74 are in the state shown in FIG. 2, the end wall 16b of the end cover 16 is held between the distal ends of the snap anchors 74 and the head 72.

A pair of wire-shaped leads 76 extend from the stator coil 62 and one of the leads 76 is passed through a center hole 78 of the lead holder 70 to outside of the end cover 16. A male screw thread 80 is cut on the distal end of the lead 76 to permit the lead 76 to be electrically connected to the motor driving circuit 64.

More specifically, the motor driving circuit 64 includes a circuit board (not shown) having insertion holes associated with the respective male screws. The male screw 80 of each lead 76 is passed through the corresponding insertion hole of the circuit board and fixed to the circuit board by an electrically conductive nut (not shown). The nut on the circuit board electrically connects the corresponding lead 76 to printed wiring on the circuit board.

An annular seal 82 is arranged in the center hole 78 of the lead holder 70 and is fitted in an annular groove cut in the inner peripheral surface of the center hole 78. The annular seal 82 gastightly seals the gap between the outer peripheral surface of the lead 76 and the inner peripheral surface of the center hole 78. Another annular seal 84 is disposed around the outer peripheral surface of the lead holder 70 and is fitted in an annular groove formed in the outer peripheral surface of the lead holder 70. The annular seal 84 gastightly seals the gap between the inner peripheral surface of the through hole 68 in the end cover 16 and the outer peripheral surface of the lead holder 70. The head 72 of the lead holder 70 has an inner end face facing the inner surface of the end wall 16b, and still another annular seal 86 is interposed between the inner end face and the end wall 16b. The annular seal 86 is fitted in an annular groove cut in the inner end face of the head 72 and surrounds the through hole 68 of the end wall 16b. The annular seal 86 gastightly seals the gap between the head 72 and the end wall 16b. These annular seals 82, 84 and 86 reliably prevent the refrigerant in the housing 10, namely, the refrigerant in the end cover 16 from leaking to the outside of the housing 10 through the through hole 68 of the end cover 16 and the center hole 78 of the lead holder 70.

Preferably, the annular seals 82, 84 and 86 are made of an electrical insulating material, like the lead holder 70. In the first embodiment, each of the annular seals 82, 84 and 86 has a rectangular cross section, as clearly shown in FIG. 2.

The other lead (not shown) of the stator coil 62 is also guided to the outside of the housing 10 through a different lead holder 70, like the aforementioned lead 76, and is electrically connected to the circuit board of the motor driving circuit 64.

The following describes how the connection device 66 is attached. First, the lead holder 70 is attached to the lead 76 with the lead 76 gastightly passed through the center hole 78. Then, the lead holder 70 is inserted, from its other end portion, into the through hole 68 of the end cover 16 from inside the end cover 16. When the snap anchors 74 of the lead holder 70 enter the through hole 68 in the process of insertion, the inner peripheral surface of the through hole 68 elastically deforms the snap anchors 74 and pushes same against the outer peripheral surface of the lead holder 70. Consequently, the snap anchors 74 yield, permitting the insertion of the lead holder 70.

When inserted past the through hole 68 thereafter, the snap anchors 74 rise radially outward away from the outer peripheral surface of the lead holder 70 due to their own restoring force. Namely, the snap anchors 74 unfold and their distal ends become engaged with the outer surface of the end wall 16b of the end cover 16.

Immediately before the snap anchors 74 unfold, the head 72 of the lead holder 70 abuts against the inner surface of the end wall 16b through the annular seal 86, so that the annular seal 86 is elastically compressed. Thus, after the insertion of the lead holder 70 is completed, the restoring force of the annular seal 86 acts in the direction of separating the head 72 from the end wall 16b, whereby the end wall 16b is tightly held between the head 72 and the snap anchors 74.

As is clear from the above, the lead holder 70 can be easily attached to the end cover 16 by just being inserted into the through hole 68 of the end cover 16 and at the same time permits the lead 76 to be guided to the outside of the end cover 16 in a gastight fashion. Since the attachment of the lead holder 70 and the electrical connection of the stator coil 62 can therefore be remarkably facilitated, the productivity of the compressor improves, making it possible to provide the scroll compressor at low cost.

The lead holder 70 holds the end wall 16b of the end cover 16 between its head 72 and its snap anchors 74, and therefore, even if applied with external force, the lead holder 70 does not come off the end cover 16. As a result, the electrical connection between the stator coil 62 and the motor driving circuit 64 is stably maintained for a long term.

The lead 76 is an extended portion of the winding constituting the stator coil 62, and it is therefore possible to rid the lead 76 of slack. Accordingly, the electrical connection between the lead 76 and the stator coil 62 is not damaged even if the armature 38 is applied with vibrating force from outside.

Since the lead holder 70 is made of a synthetic resin having both good sealing performance and good electrical insulation properties as stated above, electrical connection between the lead 76 and the end cover 16 is shut off without fail and also the refrigerant does not leak to outside through the lead holder 70 itself. Further, the lead holder 70 has a coefficient of linear expansion equal to that of the end cover 16 (housing 10), and accordingly, there occurs no difference of thermal expansion between the lead holder 70 and the end cover 16, enabling the annular seals 82, 84 and 86 to stably maintain their original sealing performance for a long term.

Figure 3:
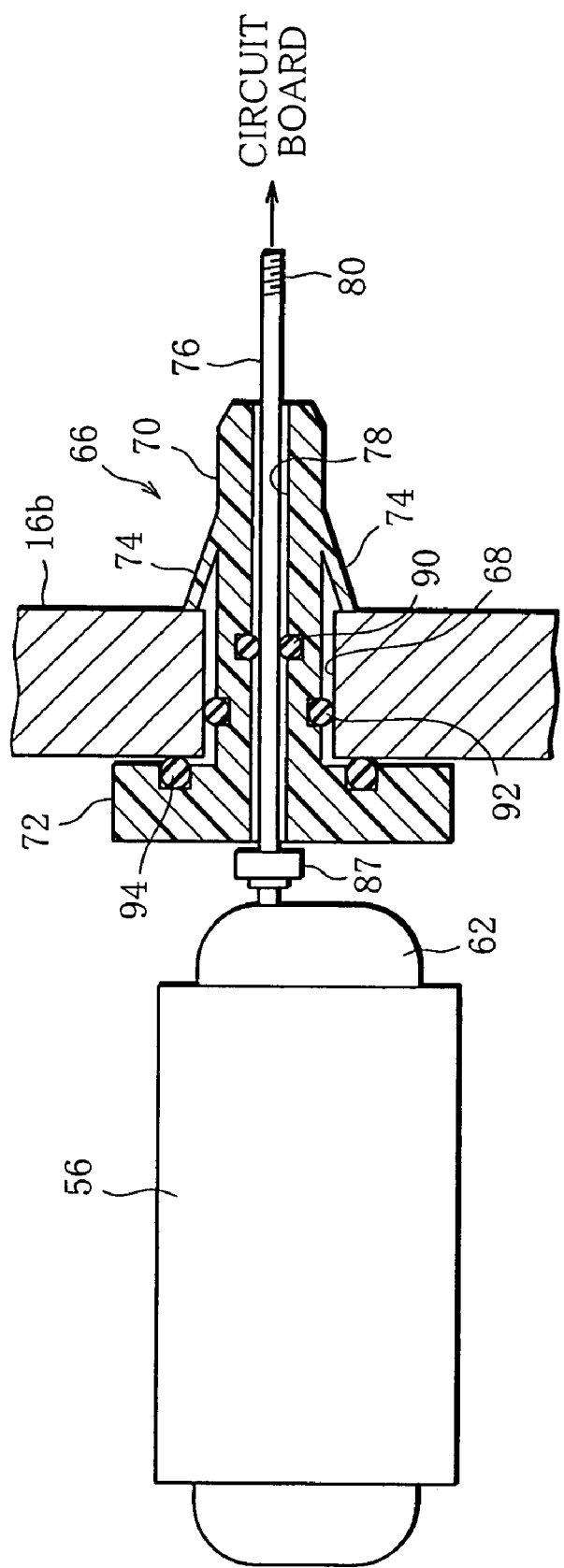
FIG. 3 is a sectional view of a connection device according to a second embodiment.

FIG. 3 illustrates the connection device 66 according to a second embodiment.

In the second embodiment, the lead 76 is not an extended portion of the winding forming the stator coil 62 but a separate member. Accordingly, the connection device 66 of the second embodiment further includes a connector 87 for electrically connecting the winding of the stator coil 62 to the lead 76. The connector 87 includes, for example, a plug attached to the winding of the stator coil 62, and a socket in which the plug is insertable and to which the lead 76 is attached. According to the second embodiment, after the lead holder 70 is attached to the end cover 16, the lead 76 and the winding of the stator coil 62 can be electrically connected to each other by using the connector 87.

Also, in the second embodiment, O rings 90, 92 and 94 are used instead of the annular seals 82, 84 and 86 of the first embodiment. The O rings 90, 92 and 94 each have a circular cross section.

In the first and second embodiments, two annular seals or two O rings are interposed between the lead holder 70 and the end cover 16, but a single annular seal or a single O ring may be used instead.

Figure 4:
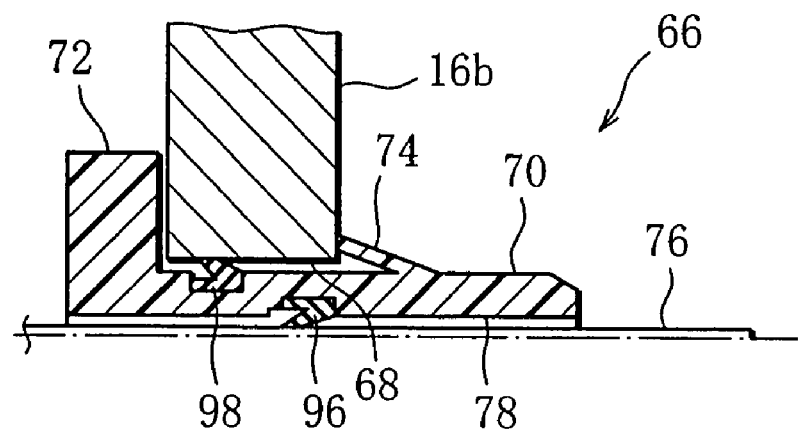
FIG. 4 is a sectional view of a connection device according to a third embodiment.

FIG. 4 illustrates the connection device 66 according to a third embodiment.

In the third embodiment, a lip seal 96 is used in place of the annular seal 82 or the O ring 90, and a lip seal 98 is used in place of the annular seals 84 and 86 or the O rings 92 and 94. In the case of using the lip seals 96 and 98, the directions of the distal ends of the lip seals 96 and 98 are of course determined taking account of the direction in which the lead 76 and the lead holder 70 are inserted.

Also, the aforementioned seals and O rings are all attached to the lead holder 70 but may alternatively be attached to the end cover 16 or the lead 76.

Figure 5:
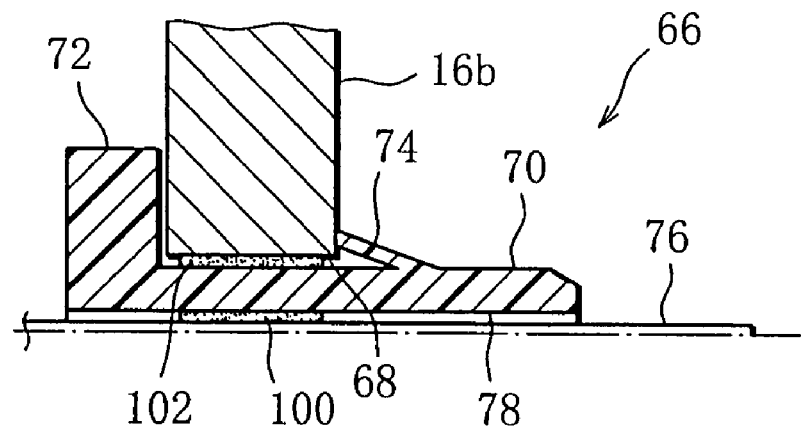
FIG. 5 is a sectional view of a connection device according to a fourth embodiment.

FIG. 5 illustrates the connection device 66 according to a fourth embodiment.

In the fourth embodiment, packings 100 and 102 are used instead of the seals or O rings. The packing 100 is disposed in the gap between the outer peripheral surface of the lead 76 and the inner peripheral surface of the center hole 78 in the lead holder 70, and the packing 102 is disposed in the gap between the outer peripheral surface of the lead holder 70 and the inner peripheral surface of the through hole 68 in the end cover 16. The packings 100 and 102 are formed by filling the respective gaps with a sealant in the form of liquid or paste.

Figure 6:
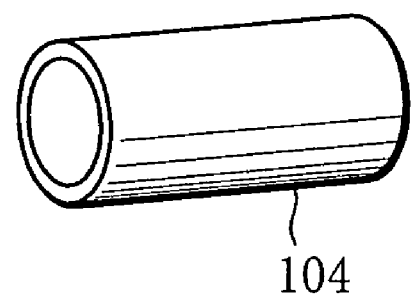
FIG. 6 is a perspective view of a tube usable as a seal.
Figure 7:
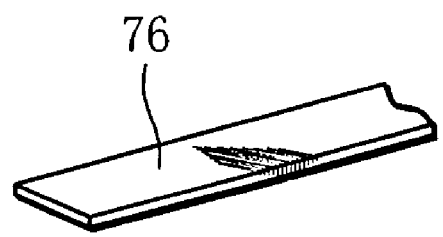
FIG. 7 is a perspective view showing a modification of a lead.

Further, a tubular seal 104 shown in FIG. 6 may be used in place of the aforementioned seals, O rings or packings. The tubular seal 104 may be made of rubber, fluorine-contained resin or the like. As shown in FIG. 7, moreover, the lead 76 may be shaped like a slender plate, namely, a strip.

The present invention may be applied to an electric motor-driven scroll expander as a fluid machine, besides the compressor.

The invention claimed is:

1. A scroll fluid machine comprising:
a housing including refrigerant for an air-conditioner;
a scroll unit contained in said housing and having a fixed scroll and a movable scroll;
an armature contained in said housing adjacently to the movable scroll of said scroll unit and configured to revolve the movable scroll to compress the refrigerant, said armature including a plurality of stator coils; and
a connection device for electrically connecting each of the plurality of stator coils of said armature to a feeder circuit external to said housing, said connection device including:
a housing wall forming part of said housing and having a through hole,
a tubular lead holder extending from inside said housing through the through hole to outside of said housing, the tubular lead holder having a center hole extending through the tubular lead holder in an axial direction thereof, a head located inside said housing, an outer end portion located outside of said housing, and snap anchors protruding integrally from the outer end portion in a radially outward direction of the tubular lead holder and engaging with an outer surface of the housing wall, the snap anchors being elastically deformable in the radially outward direction of the tubular lead holder, and having a distal end directed toward the housing wall, and a gap between each of the snap anchors and an outer peripheral surface of the tubular lead holder such that the each of the snap anchors can elastically deform about a base thereof in directions toward and away from the outer peripheral surface of the tubular lead holder, the tubular lead holder including the head, the outer end portion, and the snap anchors being a one-piece member of molded synthetic resin that is impermeable to the refrigerant,
a lead electrically connected to a stator coil of the plurality of stator coils, the lead extending from the stator coil to outside of said housing through the center hole of the tubular lead holder and connected to the feeder circuit, and
a seal structure configured to keep the tubular lead holder gastightly sealed with respect to the housing wall and further configured to keep the lead gastightly sealed with respect to the tubular lead holder, the seal structure preventing leakage of the refrigerant, the seal structure including a first seal member configured to gastightly seal a space between an inner peripheral surface of the through hole in the housing wall and the outer peripheral surface of the tubular lead holder and a second seal member configured to gastightly seal a space between an inner peripheral surface of the center hole and the outer peripheral surface of the lead, the first and second seal members being separate from the tubular lead holder, wherein, when the tubular lead holder is fitted to the housing, the each of the snap anchors cooperate with the head to hold the housing wall between each distal end of the each of the snap anchors and the head.

2. The fluid machine according to claim 1, wherein the snap anchors of the tubular lead holder each comprise a fin extending in the axial direction of the tubular lead holder.

3. The fluid machine according to claim 1, wherein the first and second seal members are attached to the tubular lead holder.

4. The fluid machine according to claim 2, wherein the seal structure further includes:

a third seal member configured to gastightly seal a gap between the head and the housing wall.

5. The fluid machine according to claim 4, wherein the first, second and third seal members are attached to the tubular lead holder.

6. The fluid machine according to claim 1, wherein the tubular lead holder comprises an electrical insulating material.

7. The fluid machine according to claim 1, wherein said connection device further includes a screw thread formed on an outer end portion of the lead.

8. The fluid machine according to claim 7, wherein the lead is an extended portion of a winding constituting said stator coil of the plurality of stator coils.

9. The fluid machine according to claim 7, wherein said connection device further includes a connector for connecting a winding constituting said stator coil of the plurality of stator coils and an inner end of the lead.

* * * * *